(12) United States Patent
Wood et al.

(10) Patent No.: US 6,662,926 B1
(45) Date of Patent: Dec. 16, 2003

(54) TRANSFER APPARATUS

(75) Inventors: Kenneth E. B. Wood, Brentwood, TN (US); Gary W. Ivey, Franklin, TN (US)

(73) Assignee: VIW, Inc., Franklin, TN (US)

( * ) Notice: Subject to any disclaimer, the term of this patent is extended or adjusted under 35 U.S.C. 154(b) by 0 days.

(21) Appl. No.: 10/341,212

(22) Filed: Jan. 13, 2003

Related U.S. Application Data

(62) Division of application No. 09/839,196, filed on Apr. 19, 2001.

(51) Int. Cl.[7] .................. B65G 47/10; B65G 47/46; B65G 47/34; B65G 47/82; B65G 37/00
(52) U.S. Cl. ................. 198/370.1; 198/370.09; 198/597; 198/607
(58) Field of Search .................. 198/370.1, 370.07, 198/370.09, 597, 607, 610; 29/428, 895.2

(56) References Cited

U.S. PATENT DOCUMENTS

| | | | | |
|---|---|---|---|---|
| 4,962,841 A | * | 10/1990 | Kloosterhouse | 198/370.09 |
| 5,375,492 A | * | 12/1994 | Smitterberg et al. | 83/13 |
| 5,609,236 A | * | 3/1997 | Neukam | 198/370.1 |
| 5,743,375 A | * | 4/1998 | Shyr et al. | 198/463.3 |
| 5,868,238 A | * | 2/1999 | Bonnet | 198/370.1 |
| 6,343,685 B1 | * | 2/2002 | Hofer | 198/370.09 |

* cited by examiner

Primary Examiner—Gene O. Crawford
(74) Attorney, Agent, or Firm—Waddey & Patterson; Lucian Wayne Beavers

(57) ABSTRACT

A transfer apparatus is provided for transferring articles laterally off of a conveyor. One embodiment of the apparatus is designed for use with a belt driven live roller conveyor, and has a serpentine transfer belt arrangement having first and second uppermost portions which when in the raised position will be located on either side of the drive belt of the main conveyor. Other features include the use of a toothed drive belt driven by a motor that may have a motor brake. The apparatus may also include a stop abutment to prevent interference by an upstream article with an article which has been selected for lateral transfer. A lifting mechanism for the transfer apparatus preferably includes an actuating ram having a ram axis oriented parallel to the width of the main conveyor.

1 Claim, 14 Drawing Sheets

TRANSFER APPARATUS

This is a divisional application of co-pending application Ser. No. 09/839,196 entitled "Transfer Apparatus", filed Apr. 19, 2001.

BACKGROUND OF THE INVENTION

1. Field of the Invention

The present invention relates generally to transfer apparatus for transferring an article laterally off of a conveyor system.

2. Description of the Prior Art

In the design of conveyor systems such as those utilized in manufacturing operations and warehousing and shipping operations, roller type conveyors are often utilized.

A roller conveyor has a plurality of regularly spaced cylindrical rollers upon which the articles, typically boxes, roll as the articles move along the length of the conveyor.

The rollers are powered in order to drive the articles along the conveyor, and power can be provided to the rollers in many different ways.

One conventional type of driven roller conveyor system is that generally known as a belt driven live roller system. A belt driven live roller system utilizes an endless drive belt that runs along the center of the conveyor with the upper side of the drive belt engaging lower surfaces of the drive rollers so that the drive rollers are driven by the drive belt. A series of idler rollers are located on the opposite side of the drive belt from the drive rollers in order to create the appropriate frictional engagement of the drive belt with the drive rollers.

Another conventional type of driven roller conveyor system is that known as a line shaft drive conveyor. A line shaft drive conveyor has a drive shaft located below the rollers and typically oriented adjacent the edge of one side of the conveyor. Each of the drive rollers is connected to the drive shaft by a flexible belt oriented in somewhat of a figure-8 shape so as to transfer the rotation of the drive shaft to rotation of the drive rollers.

Other types of driven roller conveyor systems include a "DC roller" system wherein some of the rollers have electric motors built into them, and each motor driven roller is connected to several other non-powered rollers with flexible drive belts. One DC powered roller will drive four or five adjacent rollers.

With any conveyor system there is a need for a transfer apparatus to move selected articles laterally off of the main conveyor.

With some of the above noted standard forms of driven roller conveyors, such as for example, the line shaft drive conveyor, transfer mechanisms have been constructed which utilize a plurality of transfer drive belts carried on a transfer frame. When it is desired to move an article laterally off of the conveyor, the transfer frame raises up so that the transfer drive belts extend up above the top of the rollers to lift an article off of the rollers. The drive belts are oriented parallel to the rollers and thus, the drive belts will move the article laterally when it engages the article.

With other types of driven roller conveyor systems, however, such as for example, the belt driven live roller conveyor, such a transfer mechanism has never been possible because the main conveyor drive belt is located along the center line of the conveyor and thus would interfere with the placement of such a transfer device. Accordingly, the transfer devices used to date with belt driven live roller systems have consisted of a pusher mechanism located at an elevation above the main conveyor rollers, which simply engages the article and shoves it laterally off of the main conveyor. As will be appreciated by those skilled in the art, such a pusher type transfer device does not provide precise control of the articles which are being moved laterally.

Accordingly, there is a continuing need for improved transfer devices, and particularly for improved transfer devices for use with a belt driven live roller conveyor system.

SUMMARY OF THE INVENTION

In a first embodiment the present invention provides a transfer device for transferring articles laterally off of a conveyor such as a belt driven live roller conveyor. The apparatus includes at least one, and preferably a plurality of transfer drive belts. Each of the drive belts is mounted upon a transfer frame with a plurality of belt guides, preferably roller pulleys. Each drive belt is mounted upon its respective belt guides so as to define a serpentine belt path having first and second uppermost belt portions for engaging the article to be transferred, and a lower belt portion located between the first and second uppermost belt portions. This provides a U-shape path for the upper portion of the transfer drive belt, with the bottom of the U being sufficiently deep that a conventional main conveyor drive belt of a belt driven live conveyor system can be received within the U. Thus the first and second uppermost belt portions will rise up through the rollers of the conveyor system on either side of the main conveyor drive belt to engage the article and move it laterally off of the main conveyor. A lifting mechanism is operably associated with the transfer frame and moved between a retracted position wherein the drive belt is located below the articles on the conveyor, and a raised position wherein the first and second uppermost belt portions of each transfer drive belt engage the article to be transferred.

Preferably the transfer drive belt is a toothed belt and it is driven from a toothed drive sprocket driven by a drive motor. The motor preferably has a brake so that very precise position control can be provided to the article being transferred.

The lifting mechanism preferably includes an actuating ram having an axis oriented parallel to the rollers and thus parallel to the width of the main conveyor system.

The apparatus preferably includes a stop abutment attached to the transfer frame and extending upwardly on an upstream side of the transfer apparatus so that when the lifting mechanism is in its raised position, the stop abutment extends above the main roller conveyor.

Certain aspects of the invention such as the toothed drive belts with associated toothed sprocket and motor with a motor brake, the lifting mechanism having the actuating ram oriented parallel to the width of the main conveyor, and the use of the stop abutment are also applicable to other types of conveyor systems other than the belt driven live roller conveyor system. For example, these features may be utilized with a line shaft drive conveyor system.

Accordingly, it is an object of the present invention to provide an improved transfer mechanism for use with conveyor systems.

Another object of the present invention is the provision of a transfer mechanism which may be utilized with a belt driven live roller conveyor system.

And another object of the present invention is the provision of a transfer mechanism utilizing toothed belts, particularly with a toothed drive sprocket driven by a motor having a motor brake so as to provide precise lateral position control.

And another object of the present invention is the provision of transfer mechanisms utilizing a stop abutment to prevent interference by a following article with an article being laterally transferred.

And another object of the present invention is the provision of an improved lifting mechanism for use with a transfer apparatus.

And another object of the present invention is the provision of a transfer mechanism which can easily be removed from the main conveyor system by simply unbolting a support frame from the frame of the main conveyor system and dropping the transfer mechanism out from between the rollers of the main conveyor system.

Other and further objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
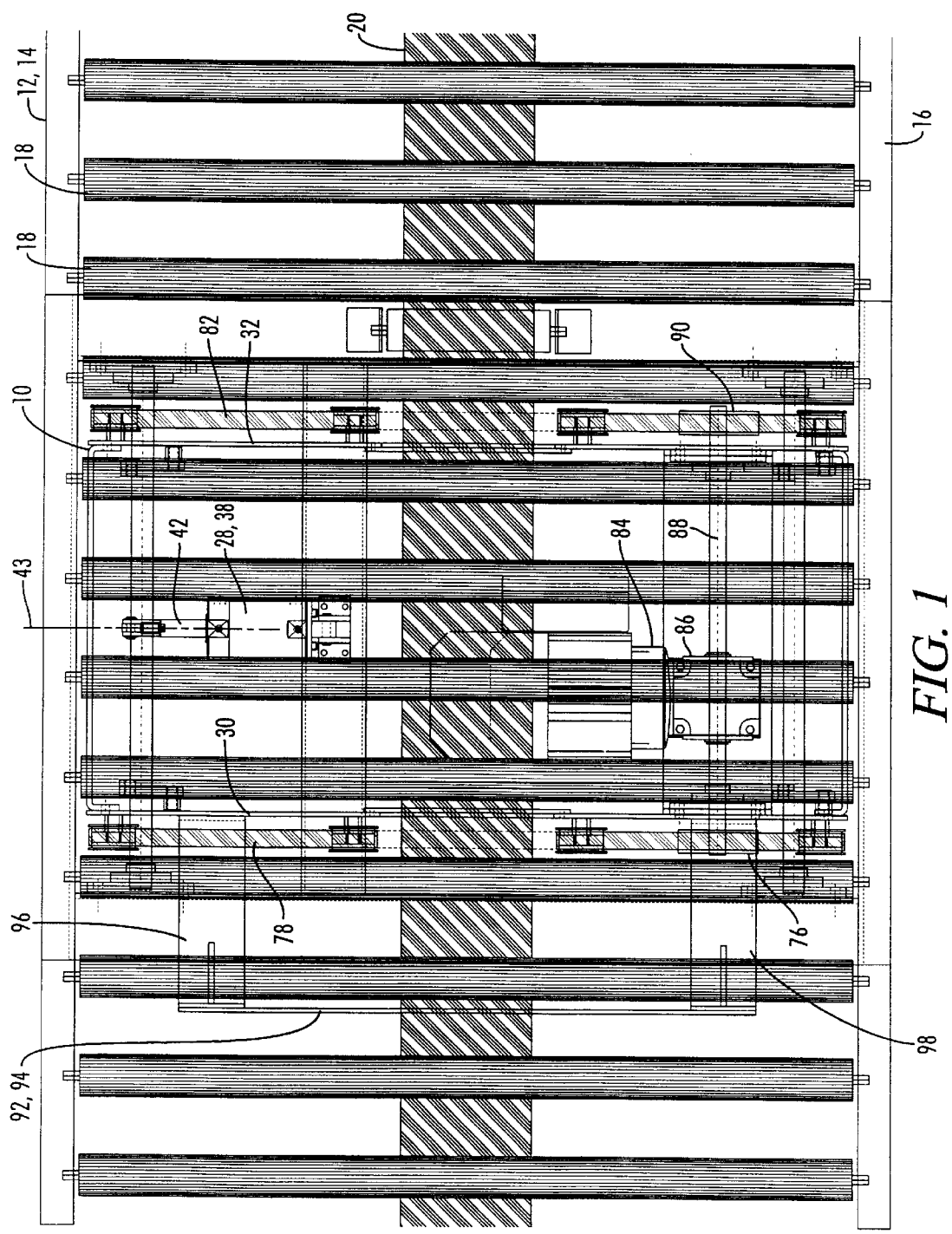
FIG. 1 is a plan view of the transfer apparatus of the present invention installed on a belt driven live roller conveyor system.

Referring now the drawings, and particularly to FIGS. 1–4, the transfer apparatus of the present invention is shown and generally designated by the numeral 10. The transfer apparatus 10 is shown assembled in combination with a belt driven live roller conveyor system 12.

The belt driven live roller conveyor system 12 which may be generally referred to as the main conveyor 12, includes a frame made of first and second spaced channels 14 and 16 with a plurality of regularly spaced cylindrical rollers 18 spanning the width of the conveyor 12 between the channels 14 and 16.

Figure 2:
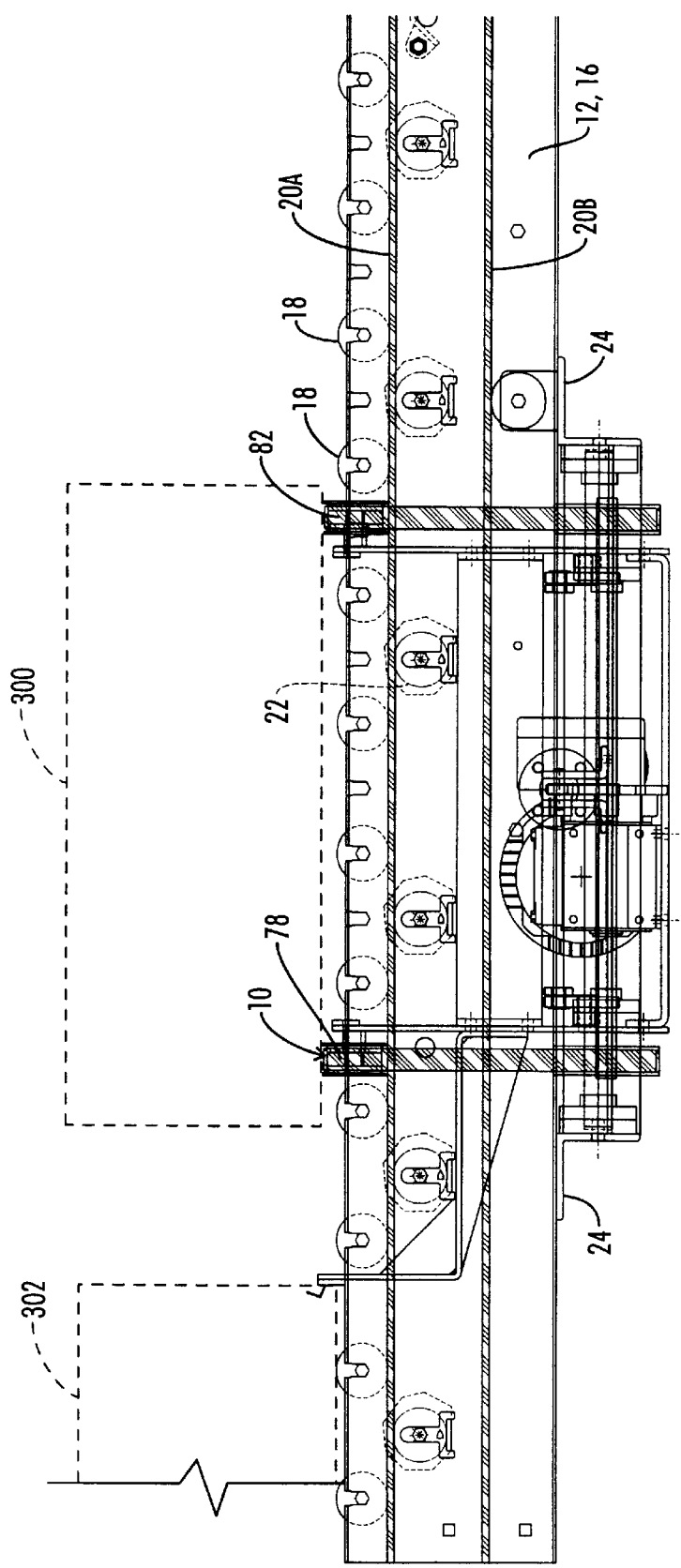
FIG. 2 is a side elevation view of the apparatus of FIG. 1.

The main conveyor 12 includes a main conveyor drive belt 20 which is an endless drive belt having an upper portion 20A and a lower portion 20B as seen in FIG. 2.

At regular intervals between adjacent rollers 18 there is an idler roller 22 which is adjustable to apply an upward pressure to the upper run 20A of the drive belt 20 in order to maintain an appropriate frictional engagement between the drive belt 20 and the lower surface of the rollers 18 so that the rollers 18 are driven by the drive belt 20. Articles carried on the conveyor 12 are driven along the length of the conveyor 12 by the rollers 18.

Figure 9:
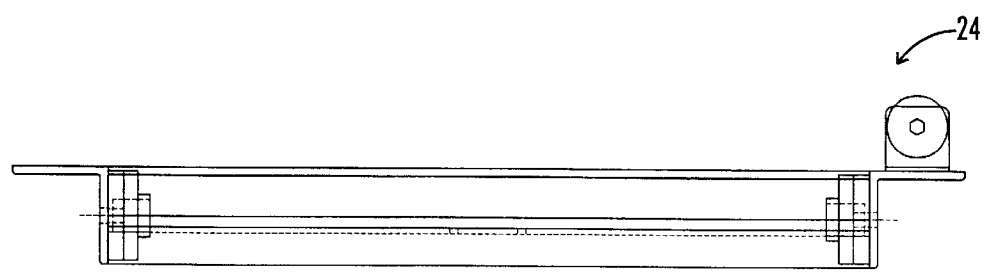
FIG. 9 is a side elevation view of the support frame of FIG. 8.
Figure 10:
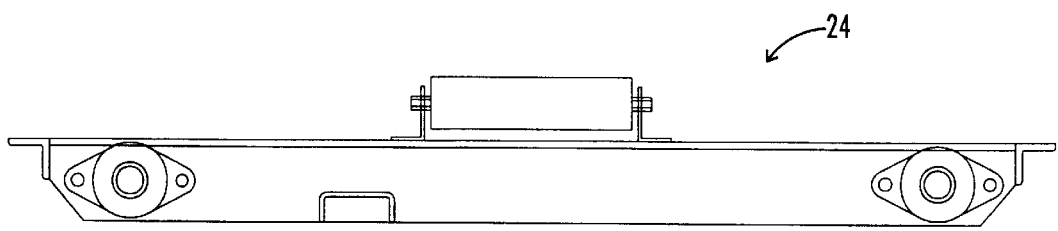
FIG. 10 is an end elevation view of the support frame of FIG. 8.
Figure 11:
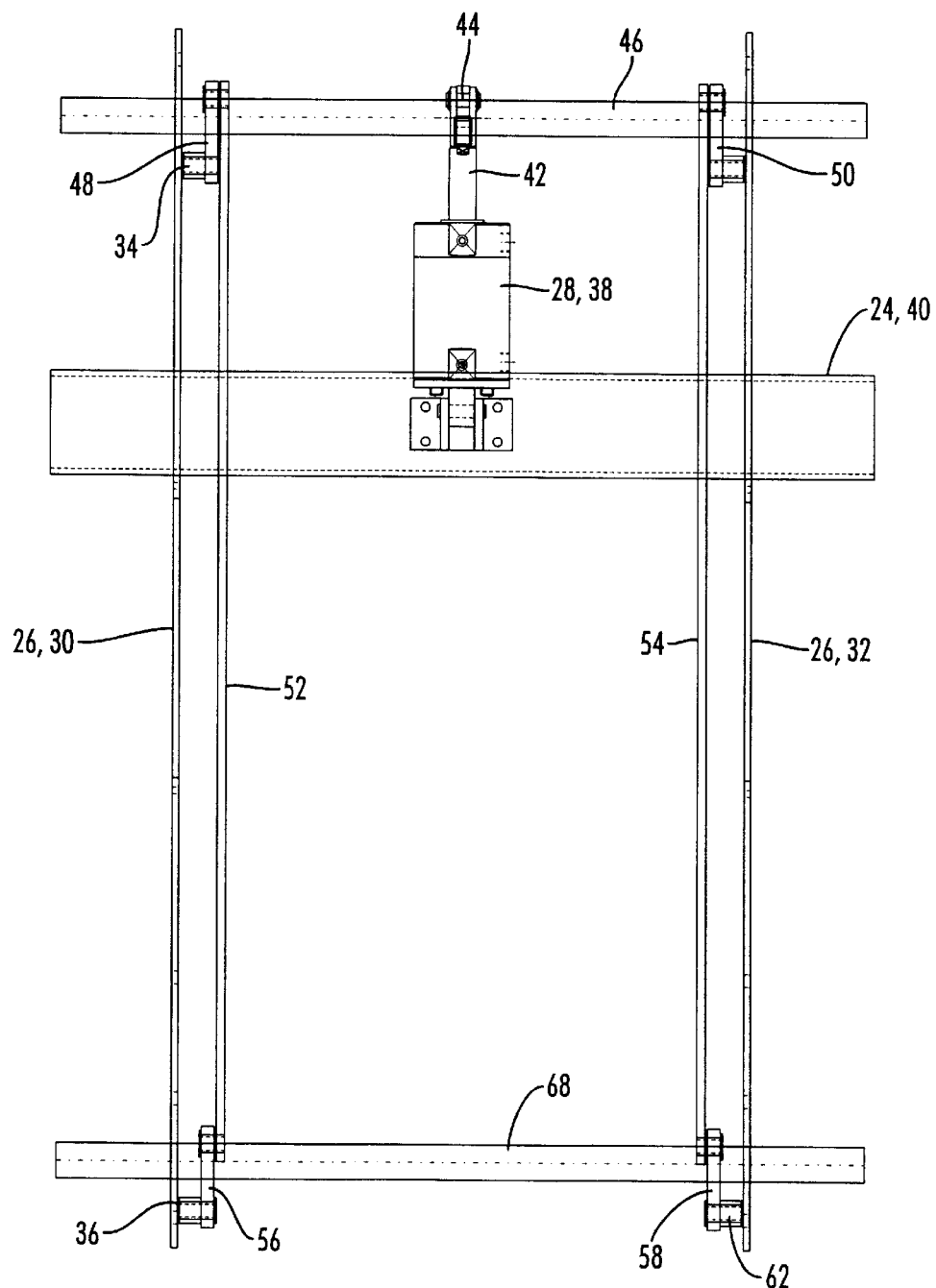
FIG. 11 is a plan view similar to FIG. 5, but showing only the transfer frame and lifting mechanism of the transfer apparatus of FIG. 5.
Figure 12:
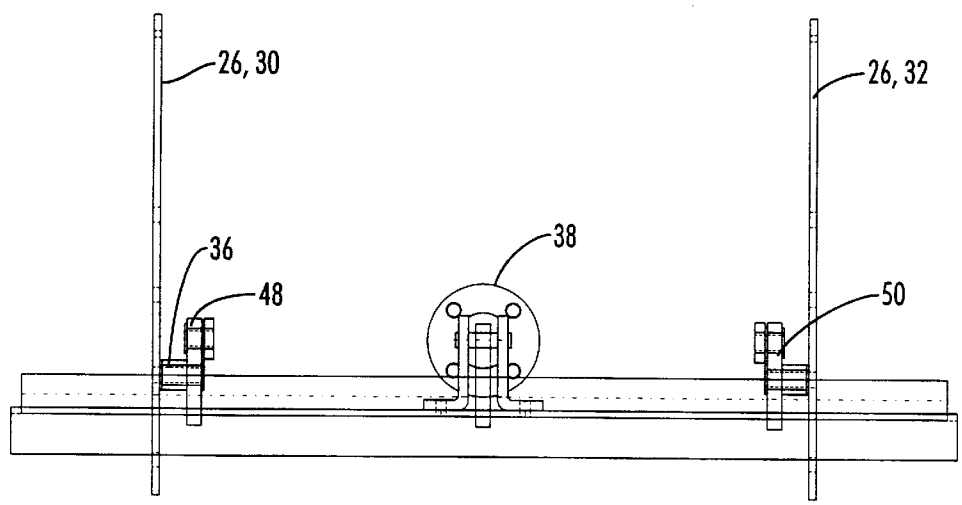
FIG. 12 is a side elevation view of the transfer frame and lifting mechanism of FIG. 11.

The transfer apparatus 10 includes a support frame 24 which spans the width of the main conveyor 12 and which is bolted to the lower flanges of the channels 14 and 16 of main conveyor 12. The details of construction of the support frame 24 may best be seen in the isolated view of FIGS. 8–10.

The transfer apparatus 10 further includes a transfer frame 26 and a lifting mechanism 28. The details of construction of transfer frame 26 and lifting mechanism 28 are best seen in the isolated views of FIGS. 11–14. The transfer frame 26 includes first and second vertical frame plates 30 and 32. Each frame plate such as frame plate 30 is supported on two pivot pins 34 and 36 which are attached to the lifting mechanism 28.

Figure 8:
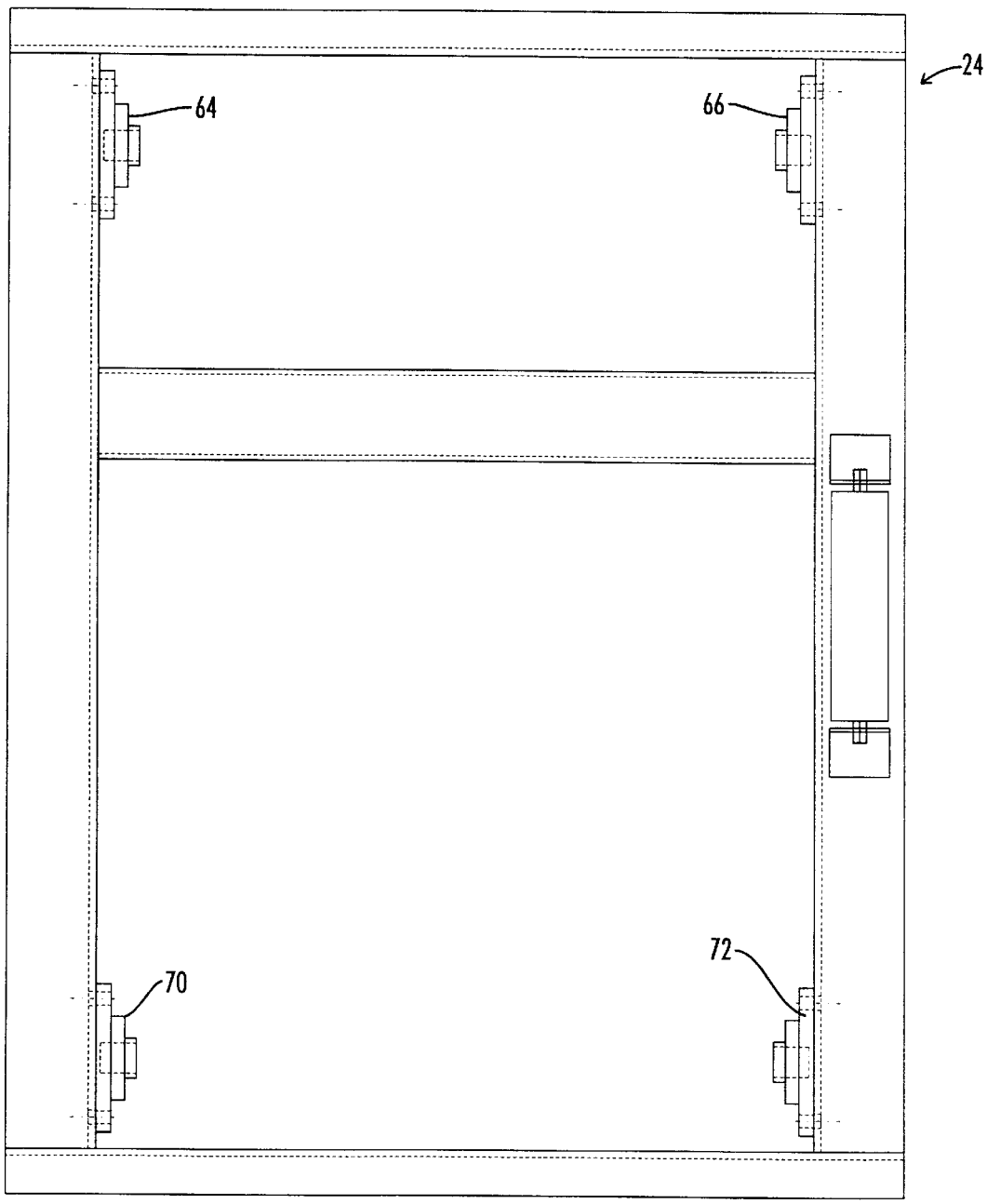
FIG. 8 is a plan view similar to FIG. 5, but showing only the fixed support frame portion of the transfer mechanism.

The lifting mechanism 28 includes an actuating ram 38, one end of which is bolted to support beam 40 of support frame 24. A piston 42 extends from ram 38 and is connected to a lever arm 44 which is fixed to a pivotable actuating bar 46 so that the actuating bar 46 can be rotated back and forth through a small arc by the extension and retraction of the piston 42 of ram 38. The actuating bar 46 is rotatably mounted to the support frame 44 by bearing blocks 64 and 66, which are best seen in FIG. 8.

The actuating ram 38 and its piston 42 have a central axis 43 (see FIG. 1) oriented parallel to a width of the conveyor 12.

Near either end of the actuating bar 46 adjacent the vertical frame plates 30 and 32 are actuating linkages 48 and 50, respectively. The actuating linkage 48 is connected to the first vertical frame plate 30 by pivot pin 34, and the actuating linkage 50 is similarly connected to the second vertical frame plate 32.

The linkages 48 and 50 are also pivotally connected to transverse connector links 52 and 54, respectively, which are in turn connected to follower links 56 and 58 which are in turn pivotally connected to the other ends of the vertical frame plates 30 and 32 by pivot pins 36 and 62.

The follower links 56 and 58 pivot about a shaft 68 which is carried in bearing blocks 70 and 72 which are mounted on the support frame 24.

Figure 13:
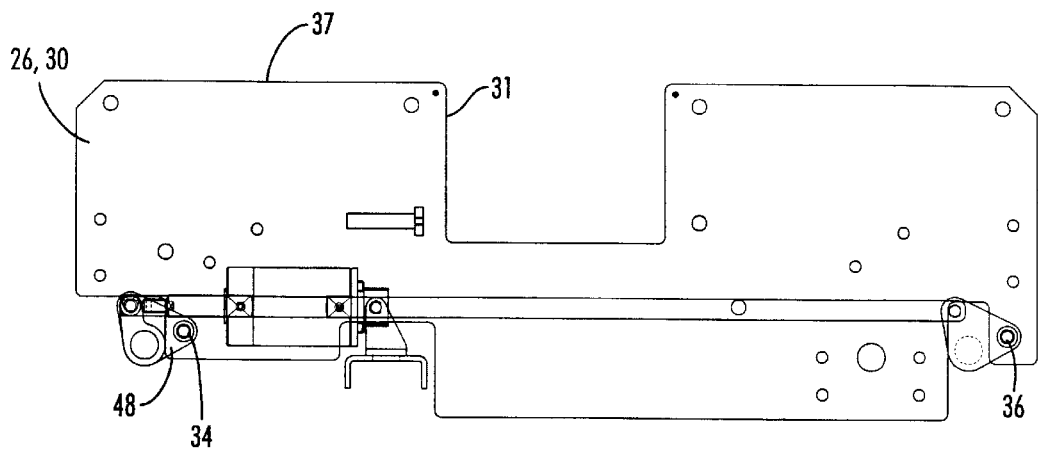
FIG. 13 is an end elevation view of the transfer frame and lifting mechanism of FIG. 11 showing the same in its raised position.
Figure 14:
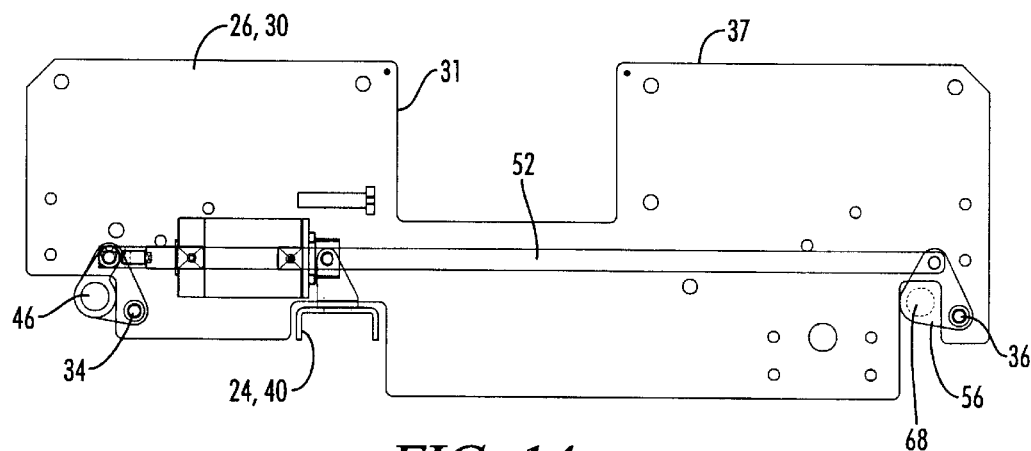
FIG. 14 is an end elevation view of the transfer frame and lifting mechanism of FIG. 11 showing the same in its lowered position.
Figure 15:
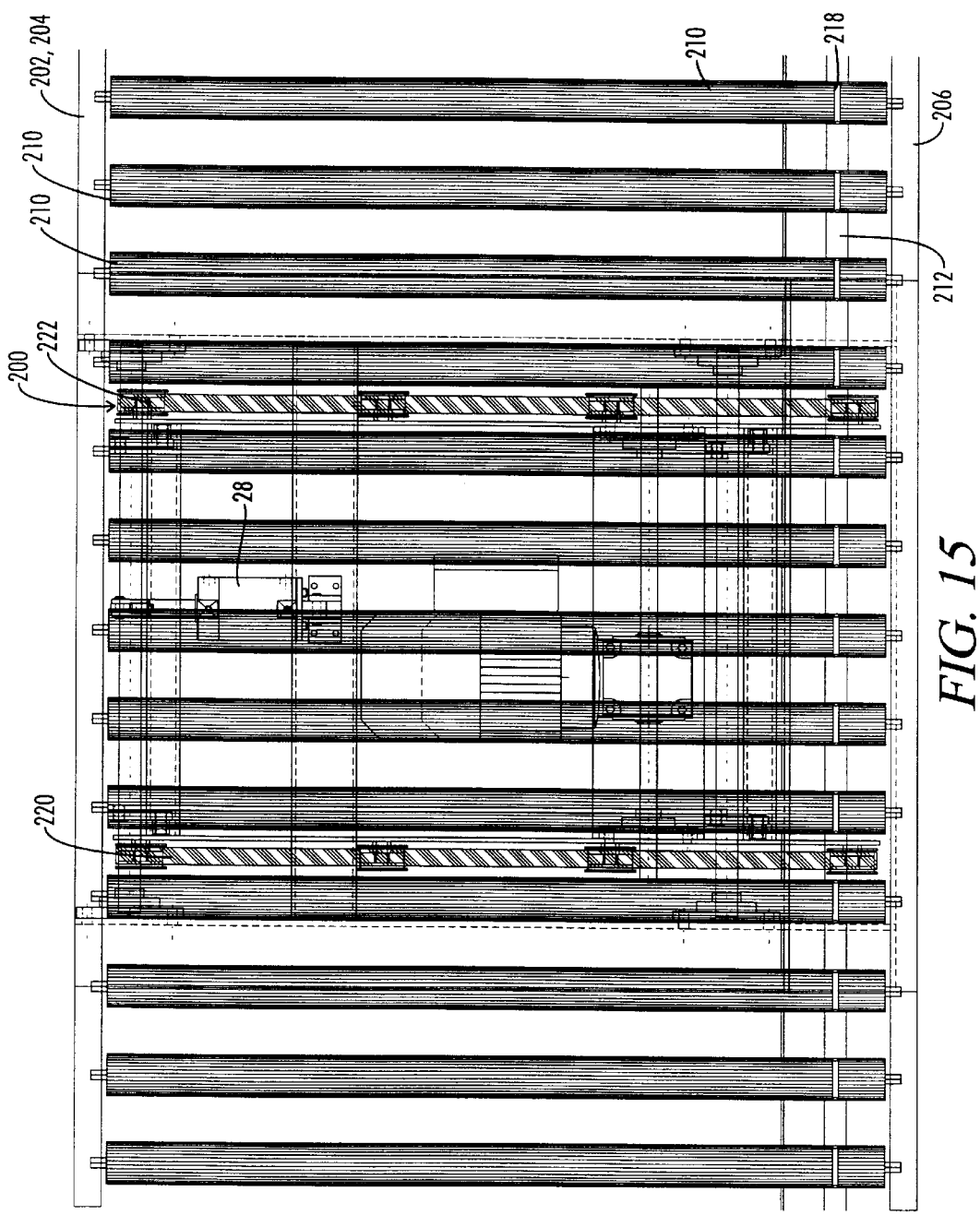
FIG. 15 is a plan view of an alternative embodiment of the transfer apparatus of the present invention as installed on a line shaft drive conveyor system.

Thus, the vertical plates 30 and 32 can be moved between their raised positions shown in FIG. 13 and their lowered positions shown in FIG. 14 by the extension or retraction, respectively, of the piston 42 of actuating ram 38.

Figure 5:
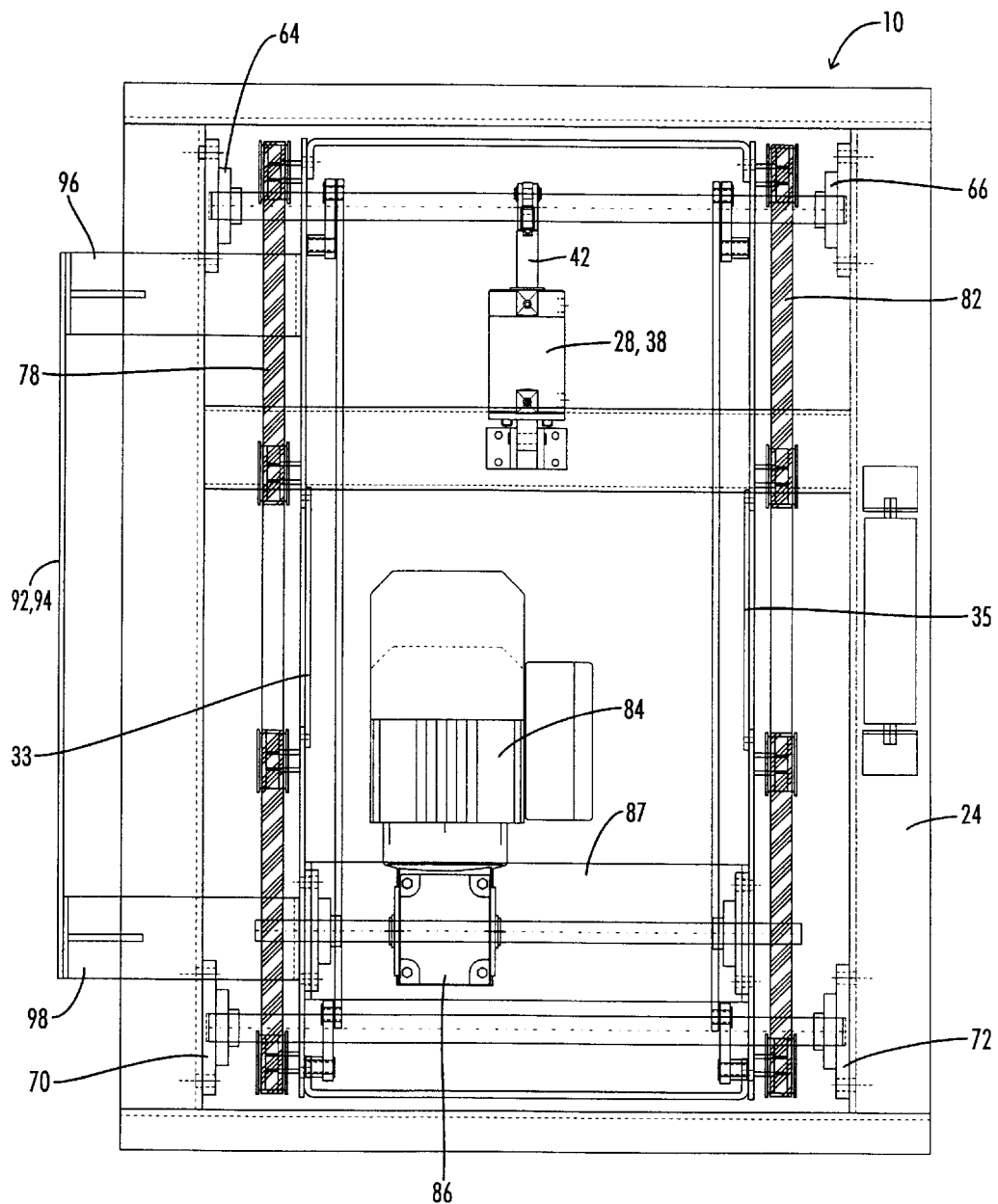
FIG. 5 is a plan view similar to FIG. 1 but showing only the transfer assembly without the belt driven live roller conveyor.
Figure 6:
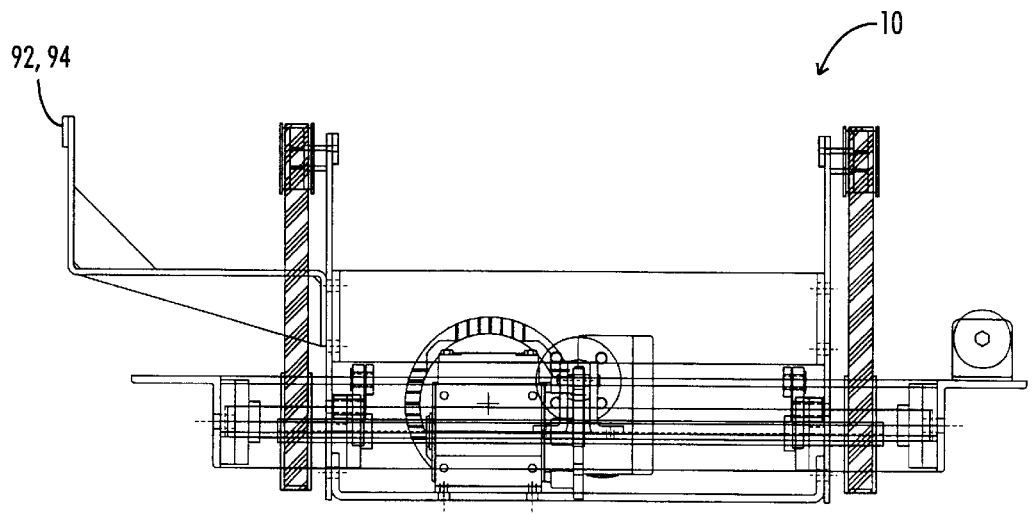
FIG. 6 is a side elevation view of the apparatus of FIG. 5.
Figure 7:
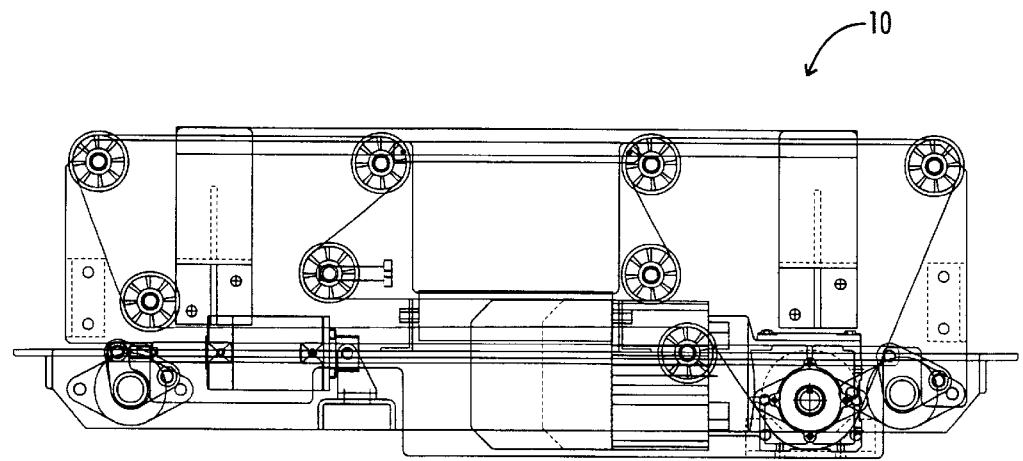
FIG. 7 is an end elevation view of the apparatus of FIG. 5 showing the transfer drive belts in their raised position.

As best seen in FIG. 13, each of the plates 30 and 32 has a U-shape opening 31 in its upper side. Gap bars 33 and 35, best seen in FIG. 5, span the openings 31 at an elevation level with the top edge 37 of the plates 30 and 32. The gap bars 33 and 35 are attached with cap screws, and are put in place after the transfer device 10 is assembled with the main conveyor 12. The gap bars will be located above the main conveyor drive belt 20.

A plurality of belt guides 74A–74H, which may also be referred to as roller pulleys 74, and a toothed drive sprocket 76 are supported from the first vertical frame plate 26 and have a first transfer drive belt 78 mounted thereon. As can best be seen in FIG. 3, the transfer drive belt 78 as mounted upon the roller pulleys 74 and drive sprocket 76 defines a serpentine belt path having first and second uppermost belt portions 78A and 78B, and a lowered or dropdown belt portion 78C located between the first and second uppermost belt portion 78A and 78B.

Figure 3:
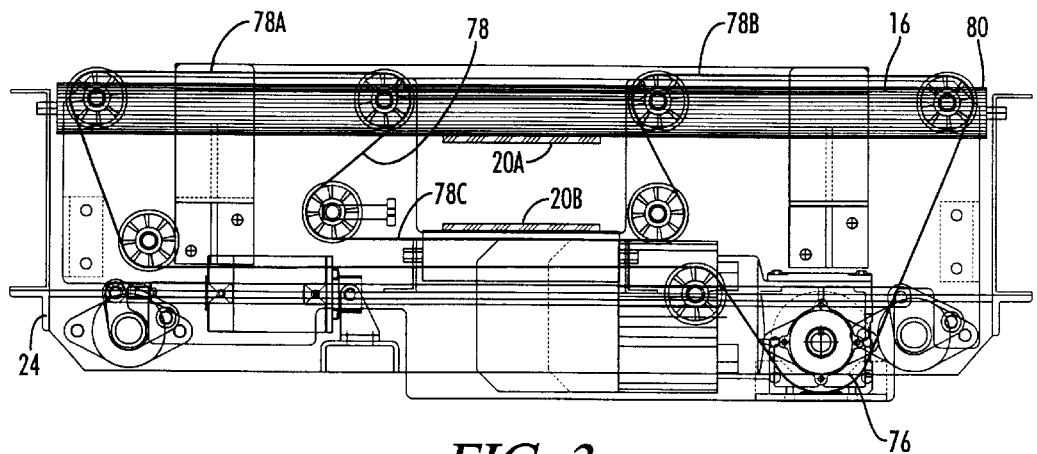
FIG. 3 is an end elevation view of the apparatus of FIG. 1 showing the transfer drive belts in their raised position.

The uppermost belt portions 78A and 78B when in their raised position as seen in FIG. 3, extend above a top surface 80 of the rollers 16 so as to engage in an article such as a box moving down the length of the conveyor 12. The lowered belt portion 78C, at all times is located below the return run 20B of the main conveyor drive belt 20 so there is no interference therebetween.

Figure 4:
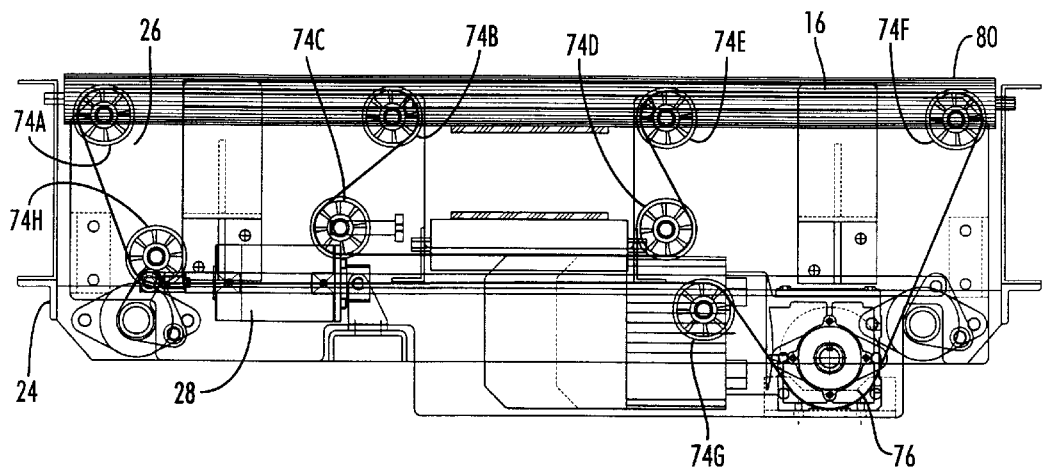
FIG. 4 is an end elevation view of the apparatus of FIG. 1 showing the transfer drive belts in their lowered position.

As seen in FIG. 4, when the lifting mechanism 28 is in its retracted position, the uppermost portions 78A and 78B of the transfer drive belt 78 are located below the top surface 80 of roller 16 so as not to engage any article moving down the length of the conveyor 12.

A second similarly constructed transfer drive belt 82 is mounted upon the second vertical frame plate 32.

As can best be seen in FIG. 1, the first and second transfer drive belts 78 and 82 are each located between two adjacent ones of the regularly spaced rollers 18 so that none of the regularly spaced rollers 18 of the main conveyor 12 have been removed to accommodate the placement of the transfer apparatus 10.

A drive motor 84 drives through a transfer case 86 to turn a drive shaft 88 which has the drive sprocket 76 attached to one end thereof and a second drive sprocket 90 attached to the other end thereof to drive the belts 78 and 82. The transfer case 86 is bolted to a support plate 87 (see FIG. 5), which is part of the transfer frame 26.

Figure 19:
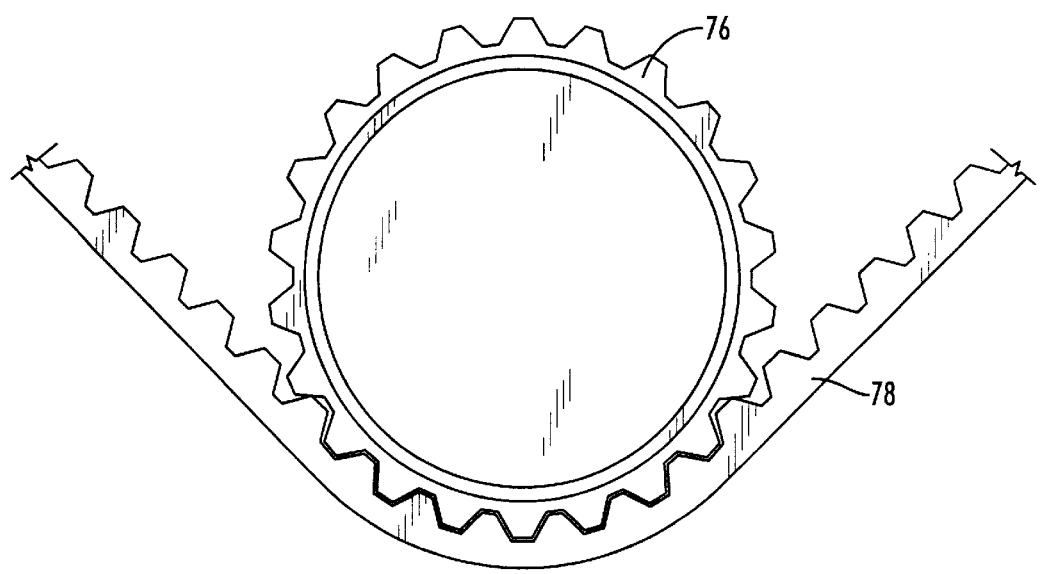
FIG. 19 is a schematic view of a toothed belt and sprocket.

The drive sprockets 76 and 90 are toothed drive sprockets and they engage the drive belts 78 and 82, which are toothed drive belts in a positive non-slip manner. The drive belts 78 and 90 are toothed drive belts constructed similar to a timing belt of an automobile engine. FIG. 19 schematically shows toothed belt 78 engaging toothed sprocket 76.

The transfer case 86 and the shaft 88 and sprockets 76 and 90 may be described as a transfer drive train between the drive motor 84 and the first and second drive belts 78 and 82.

Additionally, the motor 84 may include an internal motor brake. The combination of the drive motor with motor brake and the positive toothed engagement between the drive sprockets and the drive belts allows precise lateral position control of an article being transferred laterally with the transfer apparatus 10.

With the construction just described, the transfer apparatus 10 can be very easily assembled with or removed from the belt driven live roller conveyor 12 in the following manner.

If the transfer apparatus 10 and main conveyor 12 are already assembled as shown in FIGS. 1–4, the transfer apparatus 10 may be removed by merely unbolting the support frame 24 from its bolted engagement with the channels 14 and 16 of main conveyor 12, and removing the gap bars 31 and 33 and the stop piece 92, and lowering the lifting apparatus downward.

The transfer apparatus 10 can similarly be easily installed by simply inserting the same from below into position and bolting the support frame 24 to the channels 14 and 16 of the main conveyor 12, and then hooking up the various hydraulic and/or electrical power connections to the same. Thus, neither the main conveyor drive belt 20 nor the transfer drive belts 78 or 82 need to be removed to assemble the transfer apparatus 10 with the main conveyor 12 or to disassemble the same.

As best seen in FIG. 2, the transfer apparatus 10 may include a stop abutment 92 attached to the transfer frame 24 and extending upwardly on an upstream side of the transfer apparatus 10. As viewed in FIG. 2, articles such as boxes 300 and 302 are moving down the length of the conveyor from left to right. Thus, the left end of transfer apparatus 10 as seen in FIG. 2 is the upstream end or upstream side, and the right end of the apparatus shown in FIG. 2 is the downstream end or downstream side.

The stop abutment 92 is comprised of a cross bar 94 carried by first and second L-shaped brackets 96 and 98.

As can best be seen in FIG. 2, when the transfer apparatus 10 is in its raised position where the first and second transfer belts 78 and 82 extend upward above the rollers 18, the stop abutment 92 also extends above the rollers 18. Thus, while the transfer apparatus 10 is in its raised position, a box 302 moving downstream toward the transfer apparatus 10 will engage stop abutment 92 and thus cannot interfere with another box 300 which is being raised and transferred by the transfer apparatus 10.

The transfer apparatus 10 works in the following manner. As previously noted, conventional articles such as cardboard boxes 300 and 302 are moving down the conveyor 12 from left to right as viewed in FIGS. 1 and 2. The position of the various articles on the conveyor 12 can be sensed by various position detectors in a known manner.

When an article 300 is selected to be transferred laterally off of the main conveyor 12, which will be accomplished through the use of the conventional position detectors, the transfer apparatus 10 will be raised from its lowered position shown in FIG. 4 to its raised position shown in FIG. 3, and will come up under the selected article and lift the selected article off of the rollers 18. Then, the transfer belts 78 and 82 will move the article laterally to either side as controlled by the motion of the drive motor 84.

Also, the transfer apparatus 10 allows an article to be transferred onto the main conveyor 12 from a laterally offset position. When transferring articles onto the main conveyor 12, the braking mechanism of the drive motor 84 is utilized to accurately position the article on the main conveyor. Since the drive motor 84 includes a braking mechanism, the lateral position of the article by the drive belts 78 and 82 can be precisely controlled.

When the apparatus 10 is in its raised position to laterally transfer an article, any other articles upstream of the apparatus 10 will be prevented from moving into a position above the apparatus 10 and interfering with the transfer, due to the stop abutment 92 which will engage any such upstream articles.

The article being transferred will be engaged in at least four positions, namely the two uppermost portions of each of the serpentine drive belts 78 and 82. Two of the four locations are on either side of the main conveyor drive belt 20.

ALTERNATIVE EMBODIMENT OF FIGS. 15–18

Referring now to FIGS. 15–18, an alternative transfer apparatus 200 is thereshown assembled in combination with a line shaft drive main conveyor system 202.

The line shaft drive conveyor system 202 includes first and second spaced channels 204 and 206 having a plurality of rollers 210 spanning therebetween.

A line shaft 212 extends parallel to the length of the conveyor 202 adjacent the side thereof defined by channel 206. As will be understood by those skilled in the art, the line shaft 212 is a powered shaft which is rotating to provide power to the rollers 210.

Figure 16:
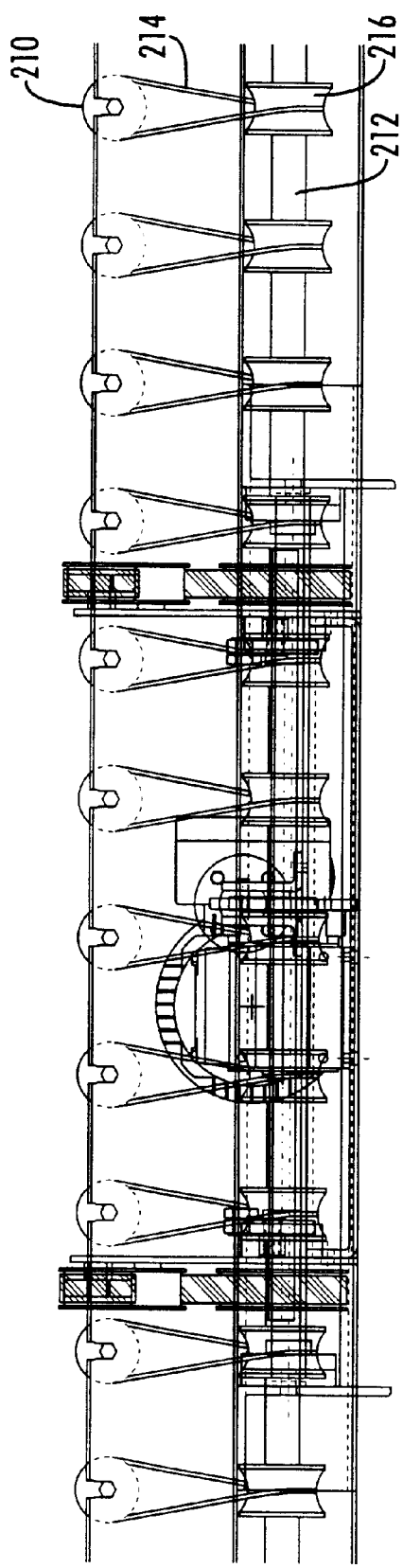
FIG. 16 is a side elevation view of the apparatus of FIG. 15.
Figure 17:
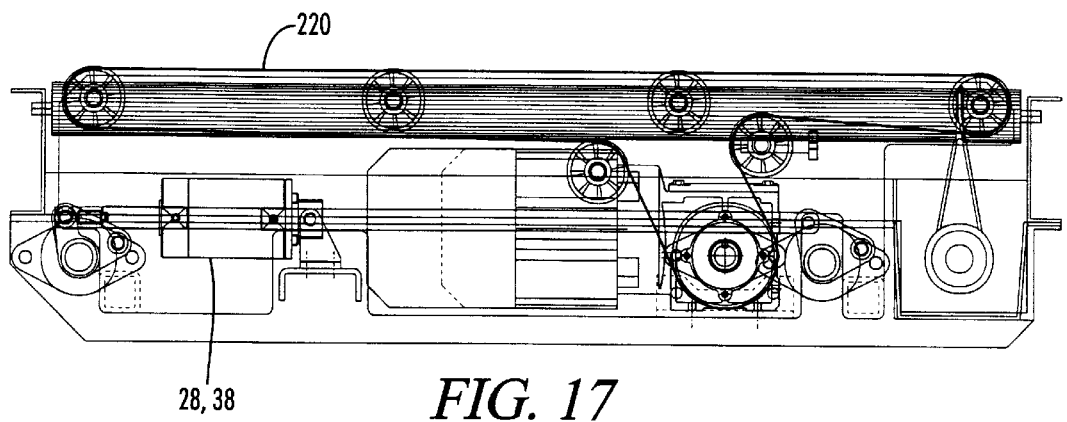
FIG. 17 is an end elevation view of the apparatus of FIG. 15 showing the transfer drive belts in their raised position.
Figure 18:
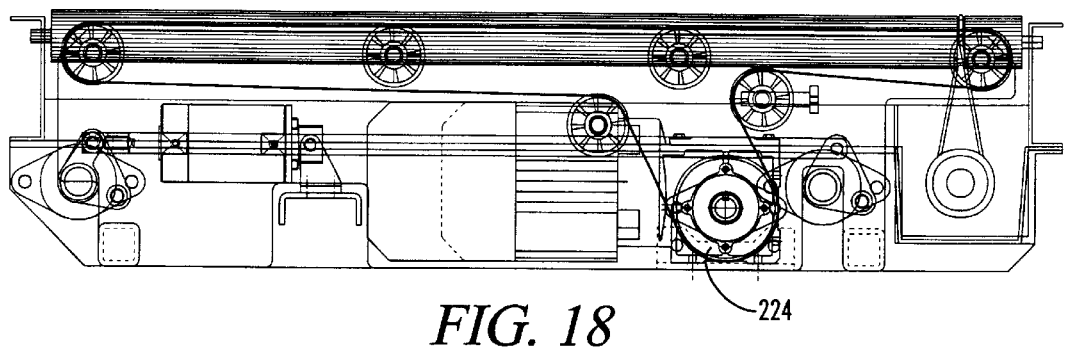
FIG. 18 is an end elevation view of the apparatus of FIG. 15 showing the transfer drive belts in their lowered position.

As best seen in FIG. 16, rotational motion is transferred from the line shaft 212 to each of the rollers 210 through a take off belt 214 received about a pulley 216 on the line shaft 212 and received within a drive groove 218 (see FIG. 15) in each of the rollers 210. The take off belt 214 is arranged in somewhat of a figure-8 shape.

Since the line drive conveyor system 202 does not have a drive belt down the center thereof, the transfer apparatus 200 can utilize first and second transfer drive belts 220 and 222 which extend substantially all the way across the width of the conveyor 202. Thus, the transfer apparatus 200 does not need to utilize the serpentine arrangement of the transfer drive belts of transfer apparatus 10 previously discussed.

Other aspects of the transfer apparatus 10, however, are embodied in the transfer apparatus 200.

One of the features carried over to the transfer apparatus 200 is the lifting mechanism 28 which is constructed in substantially identical fashion to the lifting mechanism 28 previously described.

Another feature carried over from the transfer apparatus 10 is the use of toothed drive sprockets such as 224 and the use of a toothed design for the belts 220 and 222.

Although not illustrated in FIGS. 14–18, the concept of the stop abutment 92 may also be added to the transfer apparatus 200.

The transfer apparatus 200 may similarly be easily installed and removed from the conveyor system 202 by unbolting the support frame of the same from the lower flanges of the channels 204 and 206 and lowering the same out of engagement with the main conveyor 202.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A method of installing a lateral transfer mechanism on a belt driven live roller main conveyor having a plurality of rollers and a main conveyor drive belt extending parallel to a length of the main conveyor and drivingly engaging the rollers, comprising:

(a) assembling a lateral transfer assembly, including a support frame, a transfer frame carrying a plurality of serpentine transfer drive belts, and a lifting mechanism connected between the support frame and the transfer frame;

(b) after step (a), inserting the lateral transfer assembly from below the main conveyor, so that each of the serpentine transfer drive belts is received between two adjacent rollers of the main conveyor, without having to disconnect either the main conveyor drive belt or the transfer drive belts; and (c) fixedly attaching the support frame of lateral transfer assembly to the main conveyor.

* * * * *